(12) United States Patent
Machir et al.

(10) Patent No.: US 10,330,540 B2
(45) Date of Patent: Jun. 25, 2019

(54) FORCE SENSOR

(71) Applicant: Honeywell International Inc., Morris Plains, NJ (US)

(72) Inventors: James F. Machir, Columbus, OH (US); Richard Wade, Worthington, OH (US); Jason Dennis Patch, Columbus, OH (US)

(73) Assignee: Honeywell International Inc., Morris Plains, NJ (US)

( * ) Notice: Subject to any disclaimer, the term of this patent is extended or adjusted under 35 U.S.C. 154(b) by 115 days.

(21) Appl. No.: 15/682,883

(22) Filed: Aug. 22, 2017

(65) Prior Publication Data

US 2019/0064010 A1   Feb. 28, 2019

(51) Int. Cl.

| | |
|---|---|
| *G01L 1/18* | (2006.01) |
| *G01L 1/16* | (2006.01) |
| *G01L 1/22* | (2006.01) |
| *G01L 5/00* | (2006.01) |
| *G01L 5/16* | (2006.01) |
| *H01L 41/08* | (2006.01) |

(52) U.S. Cl.
CPC .............. *G01L 1/162* (2013.01); *G01L 1/18* (2013.01); *G01L 1/2293* (2013.01); *G01L 5/0019* (2013.01); *G01L 5/167* (2013.01); *H01L 41/08* (2013.01)

(58) Field of Classification Search
CPC .................................. G01L 1/18; A61B 5/024
USPC ................................................ 73/862.627
See application file for complete search history.

(56) References Cited

U.S. PATENT DOCUMENTS

| | | | |
|---|---|---|---|
| 5,353,003 A | 10/1994 | Maurer | |
| 5,760,313 A | 6/1998 | Guentner et al. | |
| 6,874,377 B2 | 4/2005 | Karbassi et al. | |
| 7,726,197 B2 | 6/2010 | Selvan et al. | |
| 8,091,436 B2 | 1/2012 | Eckhardt et al. | |
| 8,316,725 B2 | 11/2012 | Wade | |
| 8,327,715 B2 | 12/2012 | Bradley et al. | |
| 8,757,001 B2 | 6/2014 | Wade et al. | |
| 8,806,964 B2 | 8/2014 | Thanigachalam et al. | |
| 9,003,897 B2 * | 4/2015 | Wade ...................... | G01L 1/26 73/862.621 |
| 9,003,899 B2 * | 4/2015 | Wade ...................... | G01L 1/18 73/760 |
| 9,052,246 B2 * | 6/2015 | Wade ...................... | G01L 1/18 |
| 9,164,403 B2 | 10/2015 | Kempen et al. | |

(Continued)

FOREIGN PATENT DOCUMENTS

WO    2007017301 A1    2/2007

*Primary Examiner* — Jewel V Dowtin
(74) *Attorney, Agent, or Firm* — Seager, Tufte & Wickhem LLP

(57) ABSTRACT

A force sensor or sensor assembly may include a sense die, a housing, and a force transmitting member. The sense die may include a force sensing region and at least one bond pad. The housing may include a sense die receiving cavity, at least one electrical terminal configured to engage a bond pad of the sense die, a retention member configured to prevent the sense die from sliding out of the housing, and a hole in the housing that exposes the force sensing region of the sense die to the force transmitting element. The housing may include one or more component parts. In some cases, the force sensor or sensor assembly may be configured on a microscale through micro-manufacturing techniques.

20 Claims, 7 Drawing Sheets

(56) References Cited

U.S. PATENT DOCUMENTS

| | | | |
|---|---|---|---|
| 9,869,598 B1* | 1/2018 | Wade | B81B 3/0021 |
| 2015/0062837 A1 | 3/2015 | Greiner et al. | |
| 2018/0160922 A1* | 6/2018 | Arnold | A61B 5/02444 |
| 2018/0340855 A1* | 11/2018 | Machir | G01L 9/0052 |

* cited by examiner

FORCE SENSOR

TECHNICAL FIELD

The present disclosure relates generally to sensors, and more particularly, to force sensors for sensing a force applied to the sensors.

BACKGROUND

Force sensors are often used to sense an external force applied to the sensors and provide an output signal representative of the applied force. Such sensors can be used in a wide variety of applications, including medical applications. Example medical applications include use in medical equipment in control of, for example, kidney dialysis machines, drug delivery systems, hematology equipment, infusion pumps, entrial feeders, ventilation equipment, as well as other medical equipment. Force sensors are also commonly used in non-medical applications, such as industrial applications, military applications as well as other applications.

SUMMARY

The present disclosure relates generally to sensors, and more particularly, to force sensors for sensing a force applied to the sensors. In one example, a force sensor may include a sense die, a housing, and a force transmitting member. The sense die may include a force sensing region and at least one bond pad. The housing may include a sense die receiving cavity, at least one electrical terminal, a retention member, and a hole in the housing that exposes the force sensing region of the sense die when the sense die is received by the sense die receiving cavity. The sense die receiving cavity may include a sense die receiving opening, wherein the sense die receiving cavity may be configured to slidably receive the sense die through the sense die receiving opening. The at least one electrical terminal may each extend from an external surface of the housing into the sense die receiving cavity, wherein each of the at least one electrical terminals may engage and provide a positive contact bias force against a corresponding bond pad of the sense die when the sense die has been received by the sense die receiving cavity. The retention member may prevent the sense die from sliding out of the sense die receiving cavity through the sense die receiving opening. The force transmitting element may be situated at least partially within the hole and may engage the force sensing region of the sense die to transmit an external force to the sensing region of the sense die.

In another example, a sensor assembly may include a sense die having at least one bond pad and a housing. The housing may include a sense die receiving cavity, at least one electrical terminal, and a retention member for preventing the sense die from sliding out of the sense die receiving cavity through a sense die receiving opening. The sense die receiving cavity may be configured to slidably receive the sense die through the sense die receiving opening. The at least one electrical terminal may each extend from an external surface of the housing into the sense die receiving cavity, wherein each of the at least one electrical terminals may engage and provide a positive contact bias force against a corresponding bond pad of the sense die when the sense die is received by the sense die receiving cavity.

An illustrative method of assembling a sensor assembly may include slidably inserting a sense die through a sense die receiving opening and into a sense die receiving cavity of a housing until the sense die engages a stop. While the sense die is slidably inserted, electrical terminals of the housing may slidably engage and provide a positive contact bias force against corresponding bond pads of the sense die. In some cases, the electrical terminals may extend to an external surface of the housing. The sense die may then be retained in the sense die receiving cavity by a sense die retainer.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments of the disclosure in connection with the accompanying drawings, in which.

Figure 1:
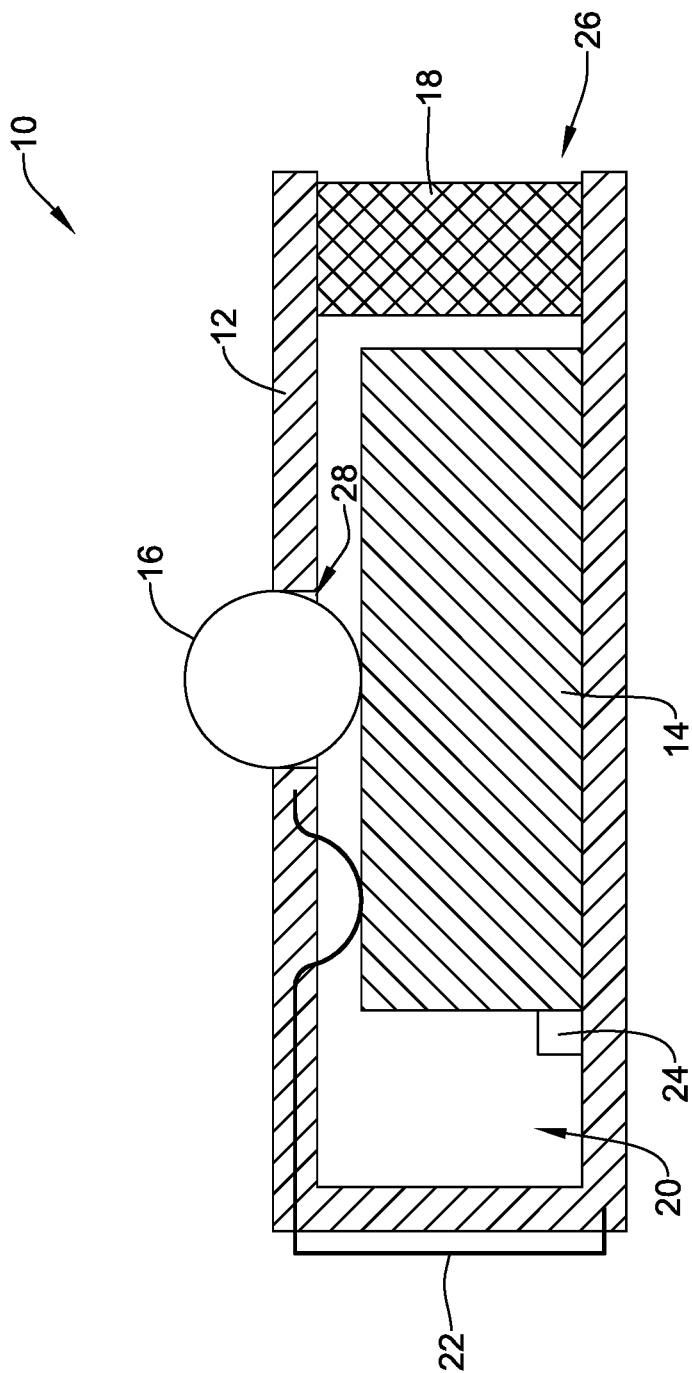
FIG. 1 is a schematic cross-sectional side view of an illustrative sensor assembly.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the disclosure.

Force sensors may be used in a variety of devices including, but not limited to, disposable devices (e.g., medical devices or other disposable devices). In some cases, devices utilizing force sensors may require the force sensor to be relatively small (e.g., have a small mechanical footprint) and a relatively low cost. In one example, the force sensor may be configured to have a size on a micro-scale, but this is not required.

An illustrative force sensor may include a housing, a sense die, an actuating or force transmitting element, and a retention member. In some cases, the housing may over mold one or more electrical terminals (e.g., leads) to form an integrated lead frame housing. In other cases, the one or more electrical terminal may be separately attached to the housing. The housing may include a sense die receiving cavity (e.g., a pocket, sleeve, recess, opening or other cavity) within the housing that is accessed via a sense die receiving opening. The sense die may include electrical pads (e.g., bond pads) such that when the sense die is received (e.g. slidably received) by the sense die receiving cavity via the sense die receiving opening, the electrical pads of the sense die mechanically and electrically contact corresponding electrical terminals of the housing. In some cases, the electrical terminals of the housing may each be configured to engage and provide a positive contact bias force (e.g. spring force) against a corresponding bond pad of the sense die when the sense die is received by the sense die receiving cavity.

The housing may be configured to guide the sense die as the sense die is received (e.g. slidably received) by the die receiving cavity. If the sense die is slidably received by the die receiving cavity, the electrical terminals of the housing may swipe along the bond pads during insertion of the sense die, while providing a positive contact bias force against the corresponding bond pad of the sense die. This swiping action may help improving the electrical connection between the bond pads and the electrical terminals of the housing.

The housing may include a die stop to stop the sense die at a desired sense die seat location. A retention member may mechanically retain the sense die at the desired sense die seat location. In some cases, the retention member may have a first position that allows insertion of a sense die into the sense die receiving cavity, and a second position that retains the sense die within the cavity. In some cases, the retention member may simply be a plug that plugs the sense die receiving opening and retains the sense die at the desired sense die seat location.

The housing may include a hole for receiving an actuating or force transmitting element that extends through the hole and makes contact with a force sensing region of the sense die. Application of a force on the actuating element may be transferred to the force sensing region of the sense die. This results in the sense die generating an electrical signal that is representative of the magnitude of the applied force. The electrical signal may be transferred to the bond pads of the sense die and to the electrical terminals of the housing.

FIG. 1 depicts a cross-sectional view of an illustrative sensor assembly 10 (e.g., a force sensor). As shown in FIG. 1, the sensor assembly 10 may include a housing 12, a sense die 14 (e.g., a force sense die, a pressure sense die, or other sense die), an actuating or force transmitting element 16 (e.g., a force transmitting element), and a retention member 18. The sense die 14 is shown schematically in block form. An illustrative but non-limiting example of a suitable force sense die 14 can be found in FIGS. 6-7.

The illustrative housing 12 may at least partially define a cavity 20 (e.g., a sense die receiving cavity) configured to slidably receive the sense die 14. The illustrative housing 12 may further include an electrical terminal 22 and a die stop 24. The die stop 24 may be an end wall of the housing 12 that at least partially defining the cavity and/or may be a separate element spaced from the end wall of the housing. The die stop 24 may be formed as an extension of one or more walls of the housing 12 and/or may be a component inserted into the sense die receiving cavity 20 (e.g., a component placed and/or secured in the sense die receiving cavity 20).

The die stop 24 may be located at any suitable location within the sense die receiving cavity 20 such that it may be configured to limit movement of a sense die 14 received within the sense die receiving cavity 20 in at least one direction, and may locate the sense die at a desired sense die seat location. In some cases, the die stop 24 may be located within the sense die receiving cavity 20 and on an opposite side of the sense die 14 from the retention member 18, as show in FIG. 1.

The housing 12 may include one or more openings. In one example, the housing 12 may include a first opening (e.g., a sense die receiving opening 26), a second opening (e.g., an actuating or force transmitting element receiving hole 28), and/or one or more other openings. The sense die receiving opening 26 may be configured to initially receive the sense die 14 when positioning the sense die in the sense die receiving cavity 20. The actuating or force transmitting element receiving 28 may expose a force sensing region (not shown in FIG. 1; see FIGS. 5 and 6) of the sense die 14 when the sense die is received and/or located in the sense die receiving cavity 20.

The housing 12 may be formed in any manner. In one example, the housing 12 may be formed by over molding one or more electrical terminals 22 (e.g., electrical leads) to form an integrated lead frame. In some cases, micro-molding processes may be utilized to form the housing 12 and/or other parts of the sensor assembly 10. The housing 12 may form a suitable type of integrated circuit package. For example, the housing 12 may be configured to be a surface mount technology (SMT) package, a small-outline integrated circuit (SOIC) package, a plastic leaded chip carrier (PLCC) package, a single in-line package (SIP), a dual in-line package (DIP), or other suitable package type. These are just examples.

The housing 12 may be formed using one or more suitable materials. Example suitable materials may include, but are not limited to, one or more of plastic, polyamide, ceramic, metal, or other suitable material. The electrical terminals 22 may be formed of metal, but may also be made of other suitable conductive material, such as a conductive polymer or the like.

In the example shown, the electrical terminal(s) 22 may be configured to extend along an exterior surface of the housing 12. The electrical terminal(s) 22 may also extend into the sense die receiving cavity 20 of the housing. The portion of the electrical terminals 22 extending along the exterior of the housing 12 may facilitate electrically connecting the sensor assembly 10 to a user device (e.g., a medical device or other device). The portion of the electrical terminals 22 extending into the sense die receiving cavity 20 may be configured to engage (e.g., contact and/or connect mechanically and electrically to) and/or provide a positive contact bias force against electrical pads of the sense die 14 (e.g., against a corresponding electrical pad of the sense die 14) when the sense die 14 has been received and/or is located at the desired sense die seat location within the sense die receiving cavity 20. In some cases, the electrical terminals 22 of the housing 12 may provide electrical connections for power, ground, and/or one or more output signals from the sense die 14. The output signals may be single ended (e.g. using single electrical terminal), a differential signal (e.g. using two electrical terminals), or any other suitable signal format. More generally, the electrical terminals 22 may be used for transmitting and/or receiving power and/or signals to/from the sense die 14.

As shown in FIG. 1, the actuating or force transmitting element 16 may include a spherical object (e.g., a ball bearing or other spherical object). Alternatively, or in addition, the actuating or force transmitting element 16 may include an extender, a button, a pin, and/or any other suitable force transmitting member shape and/or combination of shapes as desired. In some cases, the actuating or force transmitting element 16 may be configured to have a first end and a second end, and a substantially cylindrical side wall extending between the first end and the second end. The first end and/or the second end may be substantially flat, substantially semi-spherical, curved, and/or assume any other suitable shape. It may be appreciated that other types of actuating or force transmitting elements 16 may be utilized such as, for example, a slidable mounted plunger or shaft, a point of contact type component other than a spherical or semi-spherical object, a 'T' shaped transfer mechanisms, or any other suitable mechanism. In some cases, a portion of the actuating or force transmitting element 16 that is configured to contact the sense die 14 may be substantially spherical, substantially flat, curved, or may have any other suitable shape.

The actuating or force transmitting element 16 may be made of a suitable material for transferring force from exterior the housing 12 to the sense die 14. For example, the actuating or force transmitting element 16 may include metal such as stainless steel, plastic, ceramic, and/or other suitable material or combination of materials. In some cases, the actuating or force transmitting element 16 may include a stainless steel ball bearing. It is contemplated, however, that other generally spherical and other shaped elements may be used as or as part of the actuating or force transmitting element 16, if desired, including polymer based elements of any suitable shape.

The retention member 18 may be any type of retention member configured to retain the sense die 14 at a desired sense die seat location within the sense die receiving cavity 20 of the housing 12. As shown in FIG. 1, the retention member 18 may be a plug that is press-fit into the sense die receiving opening 26. In some cases, utilizing a press-fit configuration of the retention member 18 may result in creating a sensor assembly that has an improved ability to be assembled due to not needing additional parts (e.g., set screw, springs, etc.) and/or materials (e.g., adhesives, etc.) to retain the sense die 14 at the desired sense die seat location within the housing 12. The retention member 18 may have any suitable size and shape. For example, the retention member 18 may a shape with a rectangular, square, circular, triangular, star shaped, or other shaped cross-section and/or a size configured to allow the retention member 18 to be press fit into the sense die receiving opening 26. The retention member 18 may be configured from a suitable material. In some cases, the retention member 18 may be formed at least partially from a resilient or pliable material that may deflect and/or engage the housing 12 as the retention member 18 is inserted into (e.g., pressed into) the sense die receiving opening 26 of the housing. Example suitable materials for the retention member 18 may include, but are noted limited to, plastic, polyamide, ceramic, metal, and/or other suitable material.

As an alternative, or in addition to, the retention member 18 may take on one or more other forms including, but not limited to, one or more snap or spring elements configured to allow one-way movement of the sense die 14 into the sense die receiving cavity 20 but then limit backward movement of the sense die 14 out of the sense die receiving cavity 20. One such example is shown below in FIG. 4.

Figure 2:
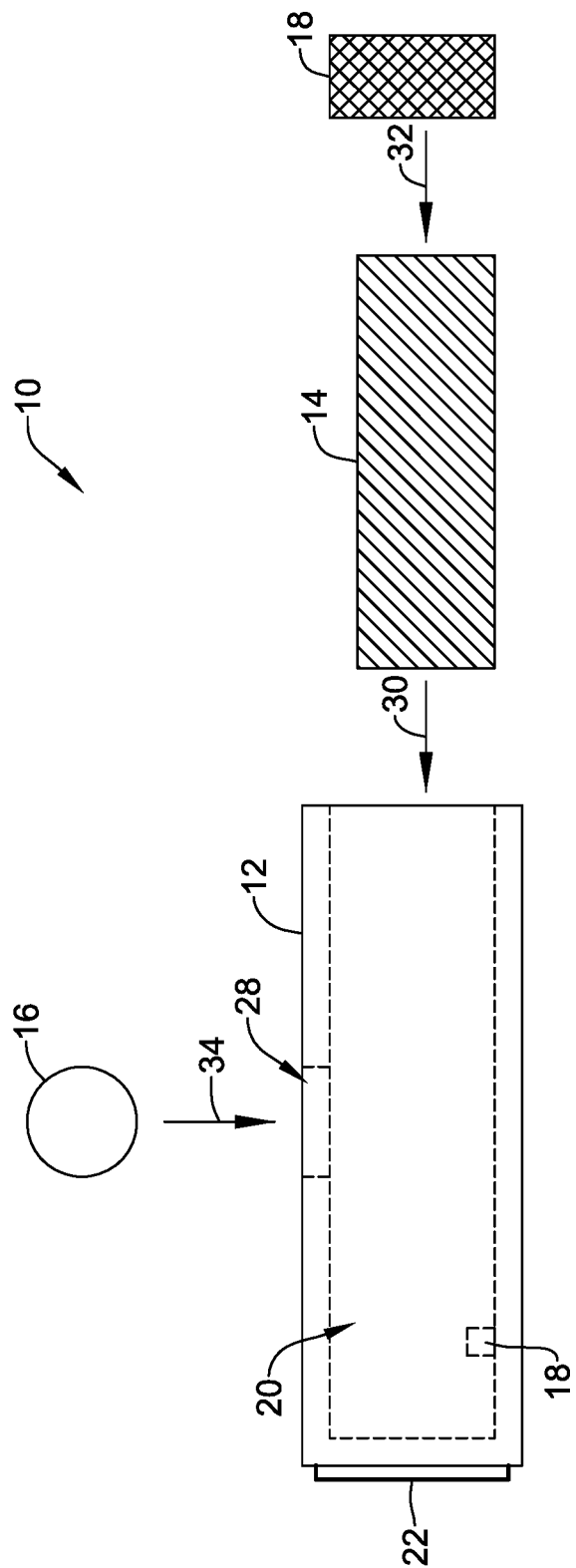
FIG. 2 is a schematic exploded side view of the illustrative sensor assembly of FIG. 1.

FIG. 2 depicts an exploded side view of the sensor assembly 10 depicted in FIG. 1 showing illustrative steps for assembling the sensor assembly 10. The sensor assembly 10 in FIG. 2 is shown with the housing 12, the sense die 14, the actuating or force transmitting element 16, and the retention member 18 separated from one another. The dashed lines in FIG. 2 depict structures within the housing 12 that are not readily viewable from a side view of the housing 12, but may interact with one or more features during assembly.

In an example method to assemble the sensor assembly 10 of FIG. 1, and during a first assembly step 30, the sense die 14 may be inserted through the sense die receiving opening 26 and into the sense die receiving cavity 20 of the housing 12. In some cases, the sense die 14 may be inserted into the sense die receiving cavity 20 until it reaches the die stop 24. The portion of the electrical terminals 22 that extend into the sense die receiving cavity 20 may engage (e.g., contact and/or connect mechanically and electrically to) and/or provide a positive contact bias force against electrical pads of the sense die 14 (e.g., against a corresponding electrical pad of the sense die 14). As can be seen in FIG. 1, the electrical terminals 22 may be configured to be bendable and resilient such that the insertion of the sense die 14 moves the electrical terminals 22 from their resting position creating the positive contact bias force.

In a second assembly step 32, a retention member 18 may be inserted into the sense die receiving opening 26. The retention member may be secured (e.g., with a press-fit, adhesive or other securing technique) in place to retain the sense die 14 between the die stop 24 and the retention member 18. In a third step 34, the actuating or force transmitting element 16 may be inserted into the housing 12 through the actuating element opening 28 and secured at least partially within the housing 12 such that the actuating or force transmitting element 16 engages a force sensing region of the sense die 14. When so provided, the actuating or force transmitting element 16 is configured to transmit an externally applied force to the force sensing region (not shown in FIG. 2; see FIGS. 5 and 6) of the sense die 14. The actuating or force transmitting element 16 may be snap fit into the housing 12 or may be inserted into and secured with respect to the housing in one or more other manners.

Although the assembly of the sensor assembly 10 is described with respect to FIG. 2 as having three ordered steps, it is contemplated that the steps may occur in any suitable order. In one example, after the sense die 14 has been inserted into the housing 12, the actuating or force transmitting element 16 may be inserted into and secured with respect to the housing 12, and once the actuating or force transmitting element 16 has been secured relative to the housing 12, the retention member 18 may be inserted into and/or secured within the housing 12. In another example, the actuating or force transmitting element 16 may be inserted into the housing before and/or at a same time as the retention member 18. These are just example variations.

Figure 3:
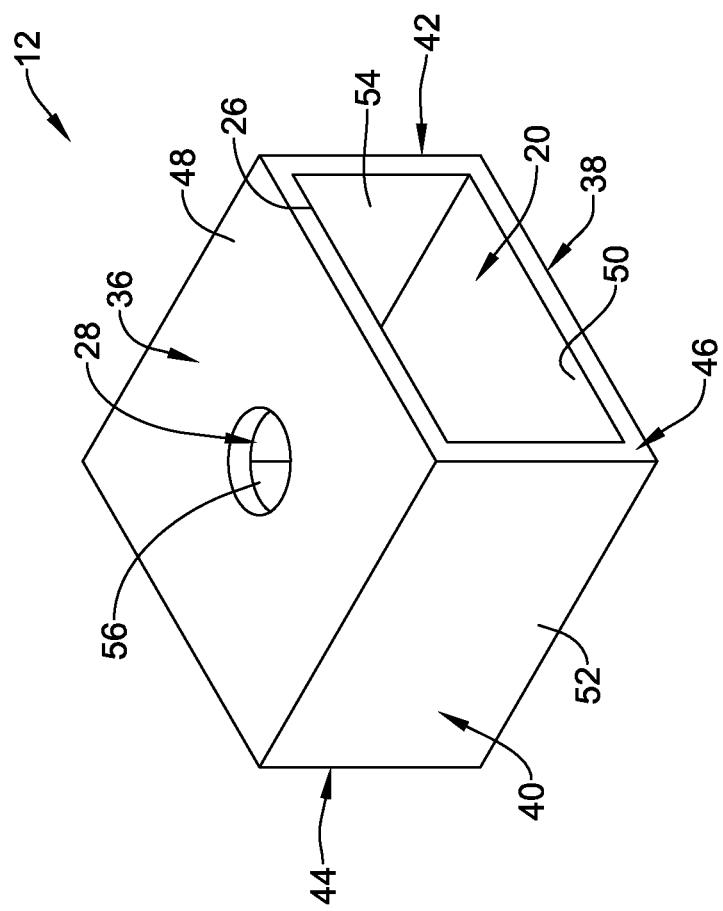
FIG. 3 is a schematic perspective view of an illustrative housing of the sensor assembly of FIG. 1.

FIG. 3 is a perspective view of an illustrative configuration of the housing 12. Although the housing 12 in FIG. 3 is depicted as a single piece housing, the housing 12 may be alternatively formed from two or more component parts. The illustrative housing 12 depicted in FIG. 3 may have a top side 36, a bottom side 38, and one or more lateral sides extending between the top side 36 and the bottom side 38. The one or more lateral sides may include a left side 40, a right side 42, a back side 44, and a front side 46. The various sides of the sensor assembly 10 may include one or more walls. In some case, the top side 36 may include a top wall 48, the bottom side 38 may include a bottom wall 50, the left side 40 may include a left wall 52, the right side 42 may include a right wall 54, and the back side 44 may include a back wall 56. The front side 46 may at least partially define the sense die receiving opening 26. Although the front side 46 is described as including the sense die receiving opening 26, the sense die receiving opening 26 may be included in one or more other sides of the housing 12. Further, the top wall 48 may include an actuating or force transmitting element receiving hole 28. Although not specifically shown, the left wall 52 and the right wall 54 may include guides that are sized to receive opposing edges of the sense die 14 to help guide the sense die 14 as the sense die 14 is slide through the sense die receiving opening 26 and into the cavity. The guides may also prevent the sense die 14 from moving in the vertical direction (e.g. toward or away from the actuating or force transmitting element receiving 28) when the sense die 14 is in the desired sense die seat location. Similar guides are shown in FIG. 5.

Figure 4:
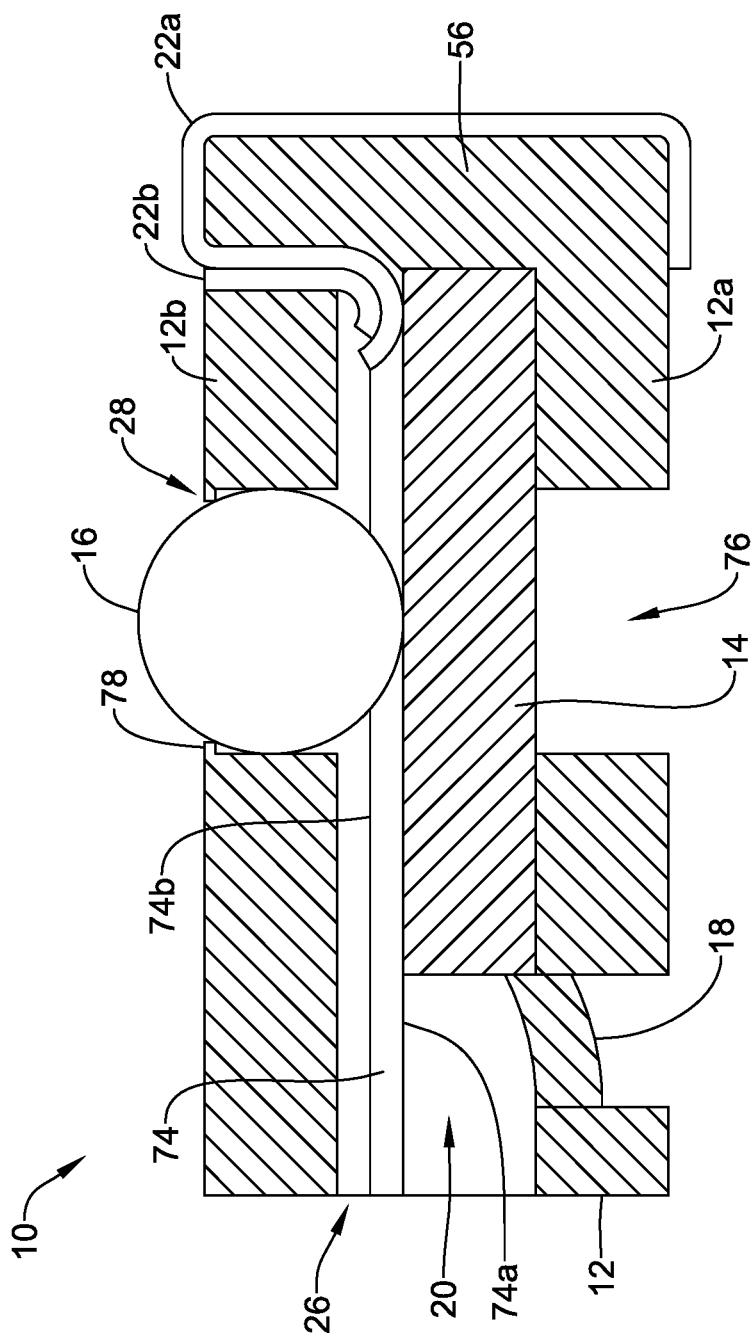
FIG. 4 is a schematic cross-sectional side view of another illustrative sensor assembly.
Figure 5:
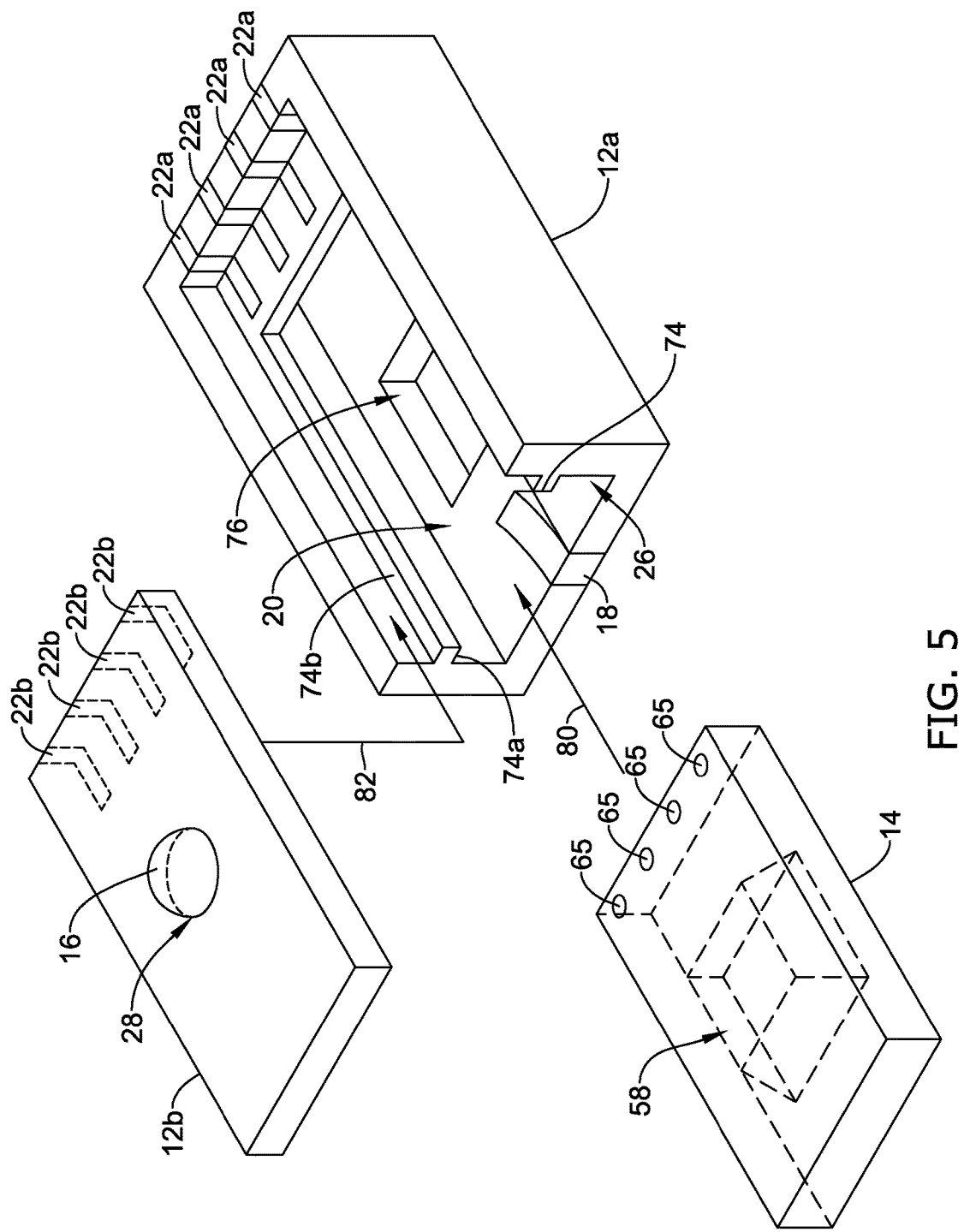
FIG. 5 is a schematic exploded view of the illustrative sensor assembly of FIG. 4.

FIGS. 4 and 5 depict another example embodiment of a sensor assembly 10. FIG. 4 is a cross-sectional view of the sensor assembly 10. FIG. 5 is an exploded view of the sensor assembly 10 depicted in FIG. 4 detailed illustrative steps for assembling the sensor assembly 10 of FIG. 4.

The sensor assembly 10 of FIG. 4 may have a first housing element 12a (e.g., a base or other housing element) and a second housing element 12b (e.g., a cover or other housing element). The first housing element 12a may be detachably connected to the second housing element 12b in one or more manners. In some cases, the first housing element 12a may connect with the second housing element 12b via a slide fit, a press fit, a spring fit, a snap fit, an adhesive, and/or other connection technique. When connected, the first housing element 12a and the second housing element 12b may form the housing 12 and a sense die receiving cavity 20 into which the sense die 14 may be inserted through a sense die receiving opening 26, similar to that discussed above with respect to the sensor assembly configuration of FIGS. 1-3. Further, although the sense die 14 in FIG. 4 is depicted as using the a back wall 56 of the housing 12 as a stop, one or more die stops similar to or different than the die stop 24 of FIG. 1 may be included within the sense die receiving cavity 20.

In some cases, one or more of the first housing element 12a and the second housing element 12b may include opposing alignment guides 74a and 74b (e.g., forming a retention groove). The alignment guides 74a and 74b may be sized to receive opposing edges of the sense die 14 to help guide the sense die 14 as the sense die 14 is slide through the sense die receiving opening 26 and into the cavity. Moreover, the alignment guides 74a and 74b may prevent or limit movement of the sense die 14 in at least one direction, such as toward or away from the force transmitting element receiving hole 28) when the sense die 14 is in the desired sense die seat location.

The first housing element 12a may include a die deflection hole 76. The die deflection hole 76 may be located in the first housing element 12a (e.g., in a bottom wall or other wall of the housing 12) at a location that may be substantially opposite the actuating or force transmitting element receiving hole 28, which may be located in the second housing element 12b (e.g., in a top wall or other wall of the housing 12). The die deflection hole 76 may be configured to allow the sense die 14 to flex or deflect in response to a force applied to the sense die 14 through the actuating or force transmitting element 16, which may provide some relief to the sense die 14.

The illustrative housing 12 of FIG. 4 may include one or more electrical terminals 22 similar to or different from that discussed above with respect to the sensor assembly 10 depicted in FIGS. 1-3. In some cases, each of the one or more electrical terminals 22 may be one piece and may extend along an outer surface of the housing 12 and into the sense die receiving cavity 20 defined by the housing 12. In other cases, the first housing element 12a may include one or more first electrical terminal portions 22a and the second housing element 12b may include one or more second electrical terminal portions 22b. The first electrical terminal portions 22a may extend along an outer surface of the housing 12 and into the sense die receiving cavity 20 defined by the housing 12. In some cases, the first electrical terminal portions 22a may be in electrical communication with the second electrical terminal portions 22b to form the electrical terminal 22 through direct or indirect contact when the first housing element 12a and the second housing element 12b are connected and/or engaging one another. Further, in some cases, the second electrical terminal portion 22b may apply a mechanical force to the first electrical terminal portion 22a (e.g., the second electrical terminal portion 22b may be a mechanical spring or other bias mechanism) to bias the first electrical terminal portion 22a toward bond pads of or other electrical contacts of the sense die 14 to facilitate good, continuous electrical contact between the first electrical terminal portion 22a and the sense die 14. In such cases, the electrical terminals 22 may form a mechanical and/or electrical connection with bond pads or other pads on the sense die 14 when it is positioned at the desired sense die seat location within the sense die receiving cavity 20. In one example, the electrical terminals 22 may be configured to supply power to the sense die 14 through one or more electrical terminals 22 and receive one or more force sensor output signals from the sense die 14.

As shown in FIG. 4, the housing 12 may include the retention member 18. In one example, the retention member 18, as depicted in FIG. 4, may be a snap or spring loaded element. The snap or spring loaded element may allow movement of the sense die 14 into the sense die receiving cavity 20, but once the sense die 14 is moved passed the retention member 18, the snap or spring loaded element may move to a lock position that limits movement of the sense die 14 back out of the sense die receiving cavity 20. In some cases, the alignment guides 74a and 74b may work with the retention member 18 to prevent the sense die 14 from lifting up over the retention member 18. Other retention member configurations, including the plug configuration discussed above with respect to the configuration of the sensor assembly 10 of FIGS. 1-3, are contemplated.

A retention member 18 having a snap or spring loaded configuration may be formed of a single component biased in one direction without additional components. Alternatively, or in addition, the retention member 19 may include a spring or other component configured to bias a retention member in a direction.

The actuating or force transmitting element 16 of the sensor assembly 10 depicted in FIG. 4 may engage the actuating or force transmitting element receiving hole 28 of the second housing element 12b in any manner. In some cases, the second housing element 12b may include one or more projections 78 that may define the actuating or force transmitting element receiving 28. The one or more projections 78 may allow for movement of the actuating or force transmitting element 16 while maintaining the actuating or force transmitting element 16 within the housing 12 adjacent the sense die 14.

FIG. 5 depicts an exploded side view of the sensor assembly 10 depicted in FIG. 4 with illustrative steps for assembling the sensor assembly 10. The sensor assembly 10 in FIG. 5 is shown with the first housing element 12a, the sense die 14, and the second housing element 12b with the actuating or force transmitting element 16 therein separated from one another.

To assemble the sensor assembly 10 of FIG. 4, and during a first assembly step 80, the sense die 14 may be inserted through the sense die receiving opening 26 and into the sense die receiving cavity 20 of the first housing element 12a. The alignment guides 74a and 74b may help guide the sense die 14. In some cases, the sense die 14 may be inserted into the sense die receiving cavity 20 until it reaches a stop (e.g., the back wall 56 (see FIG. 4), the die stop 24 (see FIG. 1), or other stop) and bond pads 65 on the sense die 14 engage the first electrical terminal portions 22a. Once the sense die 14 has been inserted into the sense die receiving cavity 20, a force sensing region 58 of the sense die 14 may align with the actuating or force transmitting element receiving hole 28 of the second housing element 12b and the die deflection hole 76 in the first housing element 12a. When the sense die 14 reaches the stop, the retention member 18 may provide a mechanical and/or audible indication due to the retention member 18 moving to its lock position.

In a second assembly step 82, the second housing element 12b may be engaged with the first housing element 12a against and/or adjacent to the alignment element 74. The first housing element 12a and the second housing element 12b may engage one another in any suitable manner including, but not limited to, through a snap connection, a slide connection, a press fit connection, adhesive, and/or one or more other connections. As the second housing element 12b engages the first housing element 12a, each of the first electrical terminal portions 22a may engage a corresponding one of the second electrical terminal portions 22b to create an electrical connection and form the electrical terminals 22.

Once the second housing element 12b is engaging the first housing element 12a, the actuating or force transmitting element receiving 28 may be automatically aligned with the force sensing region 58 of the sense die 14. In some cases, the actuating or force transmitting element 16 may be received within the actuating or force transmitting element receiving hole 28 prior to the second housing element 12b engaging the first housing element 12a, but this is not required in all cases. In some cases, the actuating or force transmitting element 16 may be added to the sensor assembly 10 after first housing element 12a and the second housing element 12b are connected by snapping or otherwise inserting the actuating or force transmitting element 16 through the actuating or force transmitting element receiving 28.

Although the assembly of the sensor assembly 10 is described with respect to FIG. 4 as having two ordered steps, it is contemplated the steps may occur in any order. In one example, the second housing element 12b may be connected to the first housing element 12a prior to inserting the sense die 14 into the sense die receiving cavity 20. In another example of assembling the sensor assembly 10 of FIG. 4, the second housing element 12b may be connected to the first housing element 12a while the sense die 14 is being inserted into the sense die receiving cavity 20 of the first housing element 12a. Other combinations of assembly steps for assembling the sensor assembly 10 are contemplated.

Figure 6:
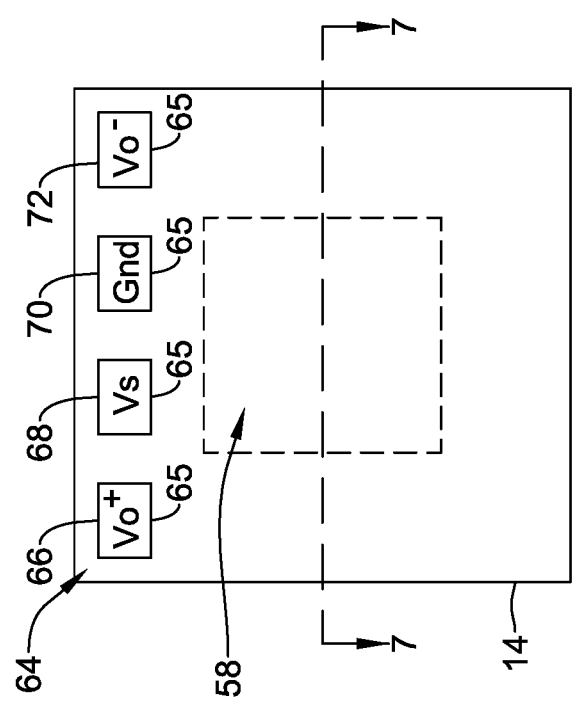
FIG. 6 is a schematic top-side view of an illustrative sense die that may be used with the illustrative sensor assemblies of FIGS. 1-5.
Figure 7:
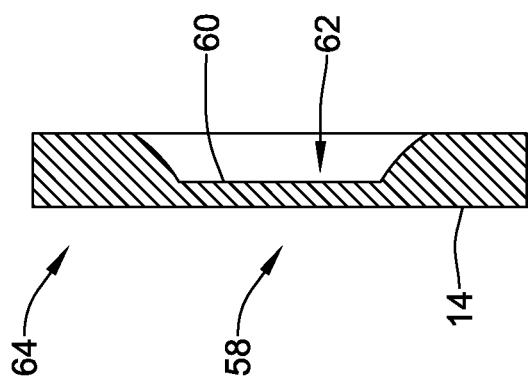
FIG. 7 is a cross-sectional view of the illustrative sense die of FIG. 6, taken along line 7-7.

FIG. 6 is a schematic top-side view of an illustrative sense die 14 that may be used with the illustrative sensor assembly 10 of FIG. 1-5. FIG. 7 is a cross-sectional view of the illustrative sense die 14 of FIG. 6, taken along line 7-7.

The illustrative sense die 14 may include a force sensing region 58, which may be configured to interact with the actuating or force transmitting element 16 to sense force applied to the sensor assembly 10. In some cases, the force sensing region 58 may include a sense diaphragm 60 (see FIG. 7) having a number of force sensing elements, such as piezoresistive sensing elements (not shown), for sensing a deflection of the sense diaphragm 60 caused by the applied force (e.g., from the actuating or force transmitting element 16). In some cases, the sense diaphragm 60 may be formed by etching out a cavity 62 into a back side of a substrate of the sense die 14, as shown in FIG. 7. In other instances, no cavity 62 is etched or otherwise provided in the back side of the substrate, and the sense die 14 may have a uniform thickness with a number of force sensing elements on the sensing surface (such as piezoresistive sensing elements, not shown) for sensing a stress on the sense die 14 caused by the applied force (e.g., from the actuating or force transmitting element 16). These are just example sense die configurations, and it is contemplated that any suitable sense die may be used.

In some cases, and as shown in FIG. 6, the sense die 14 may include a circuit area 64 adjacent or outside of the sense diaphragm 60 or at one or more other locations of the sense die 14. Although not depicted, one or more electrical components may be located within the circuit area 64. The electrical components may include one or more trimmable resistors, application specific integrated circuitry, and/or other adjustable components. In some cases, no additional electrical components are included on the sense die 14 other than the force sensing elements (e.g. piezoresistive sensing elements), electrical pads such as bond pads 65, and conductive traces connecting these components.

The sense die 14 may include electrically conductive pads 65 (e.g., bond pads), such as pads 66, 68, 70, 72, which may be configured to transmit electrical signals and/or provide power/ground to/from the sense die 14 (e.g., via electrical terminals 22 of the housing 12). In one example, the electrically conductive pads may include one or more of a power supply pad 68, a ground pad 70, a first signal path pad 66, a second signal path pad 72, and/or one or more other bond pads 65. Although not shown, the sense die 14 may include electrical traces on the surface of the sense die 14 or within the substrate that provide electrical connections between the various electrically conductive bond pads 65, the one or more electrical components in the circuit area 64, and/or the force sensing elements. In one example, the traces may be used to form electrical connections between the conductive pads 66, 70 and the force sensing elements to form a half or full Wheatstone Bridge or other circuit. In some cases, the traces may be incorporated into the substrate (e.g., p-type doping on an n-type substrate, or an n-type doping of a p-type substrate) and/or may include metal traces formed on the substrate.

The electrically conductive pads 65, such as pads 66, 68, 70, 72 and/or other pads, may be configured in a line on the sense die 14, as shown in FIG. 6. Alternatively or in addition, the electrically conductive pads, such as pads 66, 68, 70, 72 and/or other pads, may be located in the corners of the sense die 14 and/or in one or more other configurations as desired.

In some cases, the sense die 14 may be relatively small. In some cases, the sense die may have a die size of about 0.25 millimeters$^2$ and two 2 millimeters$^2$, but this is just one example. Having a small die size may reduce the cost of the sense die, and thus the sensor assembly 10.

In some instances, the sense die 14 may be a micromechanical sensor element fabricated using a silicon wafer and suitable MEMS fabrication techniques. The sense die 14 may be formed using suitable fabrication or printing techniques. In some cases, the sense diaphragm 60, as shown in FIG. 7, may be fabricated by back-side etching a silicon die (e.g., with a KOH etching technique or other etching technique), however, it is contemplated that any suitable process may be used, as desired. When utilized, the piezoresistive components may be secured relative to the sense diaphragm 60, where the piezoresistive components may be configured to have an electrical resistance that varies according to an applied mechanical stress (e.g., deflection of sense diaphragm 60 in response to a force from the actuating or force transmitting element 16). In some cases, the piezoresistive components may include a silicon piezoresistive material; however, it is contemplated that non-silicon materials may be used, as desired. The piezoresistive components may be connected in a half or full Wheatstone bridge configuration. It is to be understood that the piezoresistive components are only one example of a sensing element that can be used, and it is contemplated that any other suitable sensing elements may be used, as desired.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A force sensor comprising:
    a sense die including a force sensing region and at least one bond pad;
    a housing comprising:
        a sense die receiving cavity having a sense die receiving opening, wherein the sense die receiving cavity is configured to slidably receive the sense die through the sense die receiving opening;
        at least one electrical terminal each extending from an external surface of the housing into the sense die receiving cavity, wherein each of the at least one electrical terminal engages and provides a positive contact bias force against a corresponding bond pad of the sense die when the sense die is received by the sense die receiving cavity;
        a retention member for preventing the sense die from sliding out of the sense die receiving cavity through the sense die receiving opening;
        a hole in the housing that exposes the force sensing region of the sense die when the sense die is received by the sense die receiving cavity;
    a force transmitting element situated at least partially within the hole and engaging the force sensing region of the sense die for transmitting an external force to the force sensing region of the sense die.

2. The force sensor of claim 1, wherein the force transmitting element comprises a ball bearing.

3. The force sensor of claim 1, wherein the housing has a top side, a bottom side, and one or more side walls extending between the top side and the bottom side, and wherein the hole in the housing that exposes the force sensing region of the sense die is in the top side of the housing and the sense die receiving opening is in one or more of the side walls of the housing.

4. The force sensor of claim 1, wherein the housing further comprises a sense die stop for stopping the sense die after the sense die is slidably received into the sense die receiving cavity.

5. The force sensor of claim 1, wherein the retention member comprises a plug that is press fit into the sense die receiving opening.

6. The force sensor of claim 1, wherein the retention member comprises a snap element that is configured to allow movement of the sense die into the sense die receiving cavity and limit movement of the sense die once the sense die is in the sense die receiving cavity.

7. The force sensor of claim 1, wherein the housing comprises:
    a first housing element;
    a second housing element detachably connectable to the first housing element;
    wherein the sense die receiving cavity is formed by the first housing element and the second housing element when the first housing element and the second housing element are connected.

8. The force sensor of claim 7, wherein:
    the first housing element comprises a first electrical terminal portion;
    the second housing element comprises a second electrical terminal portion;
    the first electrical terminal portion and the second electrical terminal portion are in electrical communication and form the at least one electrical terminal when the first housing element and the second housing element are connected.

9. The force sensor of claim 1, wherein the at least one electrical terminal comprises two or more electrical terminals, and wherein the two or more electrical terminals are configured to supply power to the sense die and receive one or more force sensor output signals from the sense die.

10. The force sensor of claim 1, wherein the housing comprises a top side with a top wall, a bottom side with a bottom wall, a left side with a left wall, a right side with a left wall, a back side with a back wall, and a front side that defines the sense die receiving cavity, and wherein the hole that exposes the force sensing region of the sense die extends through the top wall of the housing.

11. A sensor assembly comprising:
    a sense die including at least one bond pad;
    a housing comprising:
        a sense die receiving cavity having a sense die receiving opening, wherein the sense die receiving cavity is configured to slidably receive the sense die through the sense die receiving opening;
        at least one electrical terminal each extending from an external surface of the housing into the sense die receiving cavity, wherein each of the at least one electrical terminal engages and provides a positive contact bias force against a corresponding bond pad of the sense die when the sense die is received by the sense die receiving cavity;
        a retention member for preventing the sense die from sliding out of the sense die receiving cavity through the sense die receiving opening.

12. The sensor assembly of claim 11, wherein the sense die is a force sense die with a force sensing region, and wherein the sensor assembly further comprises an actuating element that extends through a hole in the housing and engages the force sensing region of the force sense die.

13. The sensor assembly of claim 11, wherein the retention member comprises a plug that is configured to be inserted into the sense die receiving opening.

14. The sensor assembly of claim 11, wherein the retention member comprises a snap element that is configured to allow movement of the sense die into the sense die receiving cavity and limit movement of the sense die once the sense die is in the sense die receiving cavity.

15. The sensor assembly of claim 11, further comprising a sense die stop for stopping the sense die after the sense die is slidably received into the sense die receiving cavity.

16. The sensor assembly of claim 11, wherein the sense die receiving cavity comprises a retention groove on opposing sides of the sense die for slidably receiving opposing sides of the sense die.

17. The sensor assembly of claim 11, wherein each of the at least one electrical terminal comprise a metal lead, and the housing functions as a lead frame.

18. A method of assembling a sensor assembly, comprising:

slidably inserting a sense die through a sense die receiving opening and into a sense die receiving cavity of a housing until the sense die engages a stop;

while the sense die is slidably inserted, electrical terminals of the housing slidably engage and provide a positive contact bias force against corresponding bond pads of the sense die, the electrical terminals extending to an external surface of the housing; and retaining the sense die in the sense die receiving cavity.

19. The method of claim 18, wherein the retaining step comprises inserting a plug into the sense die receiving opening and/or activate a snap element that is configured to allow movement of the sense die into the sense die receiving cavity and limit movement of the sense die once the sense die is in the sense die receiving cavity.

20. The method of claim 18, wherein the sense die is a force sense die with a force sensing region, and wherein the method further comprises installing an actuating element through a hole in the housing to engage the force sensing region of the force sense die.

* * * * *